(12) United States Patent
Chopra et al.

(10) Patent No.: US 11,854,007 B2
(45) Date of Patent: Dec. 26, 2023

(54) METHOD AND SYSTEM FOR PRE-AUTHORIZING A DELIVERY TRANSACTION

(71) Applicant: VISA INTERNATIONAL SERVICE ASSOCIATION, San Francisco, CA (US)

(72) Inventors: Akshay Chopra, Singapore (SG); Marco Peter Lamantia, Singapore (SG)

(73) Assignee: Visa International Service Association, San Francisco, CA (US)

( * ) Notice: Subject to any disclaimer, the term of this patent is extended or adjusted under 35 U.S.C. 154(b) by 129 days.

(21) Appl. No.: 15/954,467

(22) Filed: Apr. 16, 2018

(65) Prior Publication Data
US 2019/0318355 A1    Oct. 17, 2019

(51) Int. Cl.
*G06Q 20/40* (2012.01)
*G06Q 10/083* (2023.01)
*G06K 7/14* (2006.01)

(52) U.S. Cl.
CPC ......... *G06Q 20/401* (2013.01); *G06K 7/1417* (2013.01); *G06Q 10/083* (2013.01)

(58) Field of Classification Search
None
See application file for complete search history.

(56) References Cited

U.S. PATENT DOCUMENTS

| 5,426,281 | A  | * | 6/1995  | Abecassis | G06Q 20/02 235/379 |
| 6,009,177 | A  | * | 12/1999 | Sudia     | H04L 9/0894 713/191 |
| 6,343,738 | B1 | * | 2/2002  | Ogilvie   | G06Q 20/02 235/380 |
| 6,865,559 | B2 | * | 3/2005  | Dutta     | G06Q 20/0855 705/64 |
| 6,869,690 | B1 | * | 3/2005  | Hodgens   | C23C 28/028 428/658 |
| 2002/0073049 | A1 | * | 6/2002 | Dutta    | G06Q 20/401 705/26.1 |
| 2002/0087461 | A1 | * | 7/2002 | Ganesan  | G06Q 20/10 705/39 |

(Continued)

FOREIGN PATENT DOCUMENTS

WO    2010017825         2/2010
WO    WO-2010017825 A1 * 2/2010 ............. G06Q 30/06

OTHER PUBLICATIONS

"PayPal's New Pay After Delivery Service Twists Its Model" downloaded from https://www.pymnts.com/news/2014/paypals-new-pay-after-delivery-service-twists-its-model/ Jul. 20, 2023 (Year: 2014).*

(Continued)

*Primary Examiner* — Daniel S Felten
*Assistant Examiner* — Claire A Rutiser
(74) *Attorney, Agent, or Firm* — Kilpatrick Townsend & Stockton LLP

(57) ABSTRACT

A method for pre-authorizing a delivery transaction is disclosed. A transaction value can be pre-authorized such that resources can be delivered. After the resources are delivered, a user can determine whether to continue with processing the transaction.

20 Claims, 5 Drawing Sheets

(56) References Cited

U.S. PATENT DOCUMENTS

| | | | | |
|---|---|---|---|---|
| 2005/0119942 | A1* | 6/2005 | Horrocks | G06Q 30/0637 705/26.82 |
| 2005/0125340 | A1* | 6/2005 | Lin | G06Q 20/10 705/39 |
| 2005/0273405 | A1* | 12/2005 | Chen | G06Q 40/00 705/35 |
| 2006/0178918 | A1* | 8/2006 | Mikurak | G06Q 10/06375 705/7.25 |
| 2006/0195563 | A1* | 8/2006 | Chapin | H04L 67/1095 709/223 |
| 2009/0164333 | A1 | 6/2009 | Rothman | |
| 2010/0010908 | A1* | 1/2010 | Pasupulati | G06Q 30/0601 715/705 |
| 2011/0251921 | A1* | 10/2011 | Kassaei | G06Q 20/14 705/26.41 |
| 2011/0264500 | A1 | 10/2011 | Bouthillier et al. | |
| 2012/0303535 | A1* | 11/2012 | Guest, III | G06Q 10/10 705/80 |
| 2014/0100991 | A1* | 4/2014 | Lenahan | G06Q 10/0833 705/26.7 |
| 2015/0046292 | A1* | 2/2015 | Zamer | G06Q 30/0629 705/26.64 |
| 2015/0310387 | A1* | 10/2015 | Friedman | G06Q 10/0837 705/26.8 |
| 2016/0078416 | A1* | 3/2016 | DeLuca | H04W 4/021 705/43 |
| 2016/0086128 | A1* | 3/2016 | Geiger | G06Q 10/063118 705/7.17 |
| 2016/0125492 | A1* | 5/2016 | Walker | G06Q 30/0613 705/26.41 |
| 2017/0061372 | A1* | 3/2017 | Agarwal | G06Q 10/0835 |
| 2017/0116603 | A1* | 4/2017 | Bogaard | G06Q 20/02 |
| 2017/0185979 | A1* | 6/2017 | Lopez | G06Q 20/40 |
| 2018/0053162 | A1 | 2/2018 | Janes | |
| 2018/0096175 | A1* | 4/2018 | Schmeling | G06F 1/3206 |
| 2018/0197168 | A1* | 7/2018 | Belemlih | G06Q 10/0833 |
| 2018/0260867 | A1* | 9/2018 | Lin | G06Q 20/405 |
| 2019/0095858 | A1* | 3/2019 | Unnerstall | G06Q 20/10 |
| 2019/0304004 | A1* | 10/2019 | Schwantes | G06Q 10/0836 |

OTHER PUBLICATIONS

PCT/US2019/027075 , "International Search Report and Written Opinion", dated Jul. 15, 2019, 13 pages.

What is Pay After Delivery? https://www.paypal.com/us/selfhelp/article/What-is-Pay-After-Delivery-FAQ918, last visited site on Apr. 25, 2018, 3 pages.

Collect on Deliver (COD), https://www.ups.com/us/en/shipping/services/value-added/cod.page, last visited site on Apr. 25, 2018, 5 pages.

Wikipedia Cash on Delivery, https://en.wikipedia.org/wiki/Cash_on_delivery, last visited site on Apr. 25, 2018, 2 pages.

Application No. AP/P/2020/012726 , Office Action, dated May 16, 2022, 3 pages.

Application No. SG11202010088X , Written Opinion, dated Aug. 26, 2022, 13 pages.

Application No. AP/P/2020/012726 , Office Action, dated Feb. 24, 2023, 4 pages.

* cited by examiner

METHOD AND SYSTEM FOR PRE-AUTHORIZING A DELIVERY TRANSACTION

CROSS REFERENCE TO RELATED APPLICATIONS

None

BACKGROUND

Existing electronic communication technology allows transactions to occur between computers in different remote locations. For example, a user computer can electronically communicate with a remote server computer to access secure data stored at the remote server computer. The user computer may transmit a set of access credentials to a remote server computer, which can verify the access credentials and thereby immediately authorize the user computer to access the secure data. As examples, login credentials can be transmitted to access an online subscription (e.g., to an online newspaper), personal data can be transmitted to access a personal account (e.g., a personal medical data account), transaction credentials can be transmitted to utilize a transaction account, etc.

While current electronic transaction communication technology is useful for certain applications, it has problems in some situations. For example, if an online transaction involves the exchange of a user's value for a resource provider's resource, the user may wish to test the resource before committing to the transaction. However, a resource provider typically will not deliver the resource to the user until after the transaction is authorized. Thus, with the current technological infrastructure, it is not possible for the user to test a remotely-located resource without first committing to the transaction.

At best, after a transaction is authorized and the resource delivered to the user, and the user may have the option to return the resource, reverse the transaction, and thereby recover a transacted value (e.g., if the user finds the resource unsatisfactory after testing). However, the transaction reversal process requires additional processing that consumes system bandwidth, and the user's value is unavailable until the reversal is complete.

Embodiments of the invention address these and other problems individually and collectively.

SUMMARY

Embodiments of the invention enable resources to be delivered before a transaction is authorized by introducing pre-authorization communications and subsequent user acceptance communications into a transaction process. A resource provider computer can electronically communicate with an authorizing entity computer to pre-authorize the transaction. The pre-authorization can place a hold on a user's account, demonstrating that subsequent authorization is possible and thereby establishing sufficient transaction assurance for the resource provider to release the resources for delivery to the user. Once delivered, the user can inspect the resources. If the user is satisfied with the resources, the user device can electronically communicate with the resource provider computer (e.g., through acceptance request/response messages) to indicate that the resources will be kept and not returned. Then, the resource provider computer can proceed to electronically process the transaction, for example by sending a second authorization request message or a clearance request message to the authorizing entity computer, the message including the same transaction identifier used during the pre-authorization. If the user decides to return the resources after inspection, the resource provider computer can cancel the transaction and release the account hold, for example by sending an authorization release message.

One embodiment of the invention is directed to a method. The method comprises receiving, by a resource provider computer, from a user device, a request to pre-authorize a transaction for one or more resources, and transmitting a pre-authorization request message for the transaction to an authorizing entity computer. The pre-authorization request message indicates a value for the transaction. The authorizing entity computer thereafter pre-authorizes the transaction and holds the value. The method also includes receiving a pre-authorization response message from the authorizing entity computer indicating that the transaction is pre-authorized, transmitting an instruction to deliver the one or more resources, and receiving a message indicating that the one or more resources were delivered. The method further comprises transmitting a subsequent message to process the transaction for the value or for less than the value to the authorizing entity computer or a processing network computer.

Another embodiment of the invention is directed to a resource provider computer configured to perform the above-described method.

Another embodiment of the invention is directed to a method comprising receiving, by a user device, from a user, a selection of one or more resources to be delivered to the user for a transaction, and receiving an indication to pre-authorize the transaction. The method also includes sending a request to pre-authorize the transaction for the one or more resources to a resource provider computer. The resource provider computer thereafter initiates a pre-authorization request message with a value for the transaction to an authorizing entity computer. The authorizing entity computer pre-authorizes the transaction and holds the value, and also transmits a pre-authorization response message back to the resource provider computer. The method further comprises receiving an acceptance request message. The acceptance request message prompts the user device to indicate that the one or more resources were delivered and are accepted. The method also includes displaying a prompt to the user to indicate whether the delivered one or more resources are accepted, and receiving an indication from the user that at least one of the delivered one or more resources are accepted. The method further comprises sending an acceptance response message. The acceptance response message indicates that at least one of the delivered one or more resources are accepted. The resource provider computer thereafter transmits a subsequent message to the authorizing entity computer or a processing network computer to process the transaction for the value or for less than the value.

Another embodiment of the invention is directed to a user device configured to perform the above-described method.

Further details regarding embodiments of the invention can be found in the Detailed Description and the Figures.

DETAILED DESCRIPTION

Figure 1:
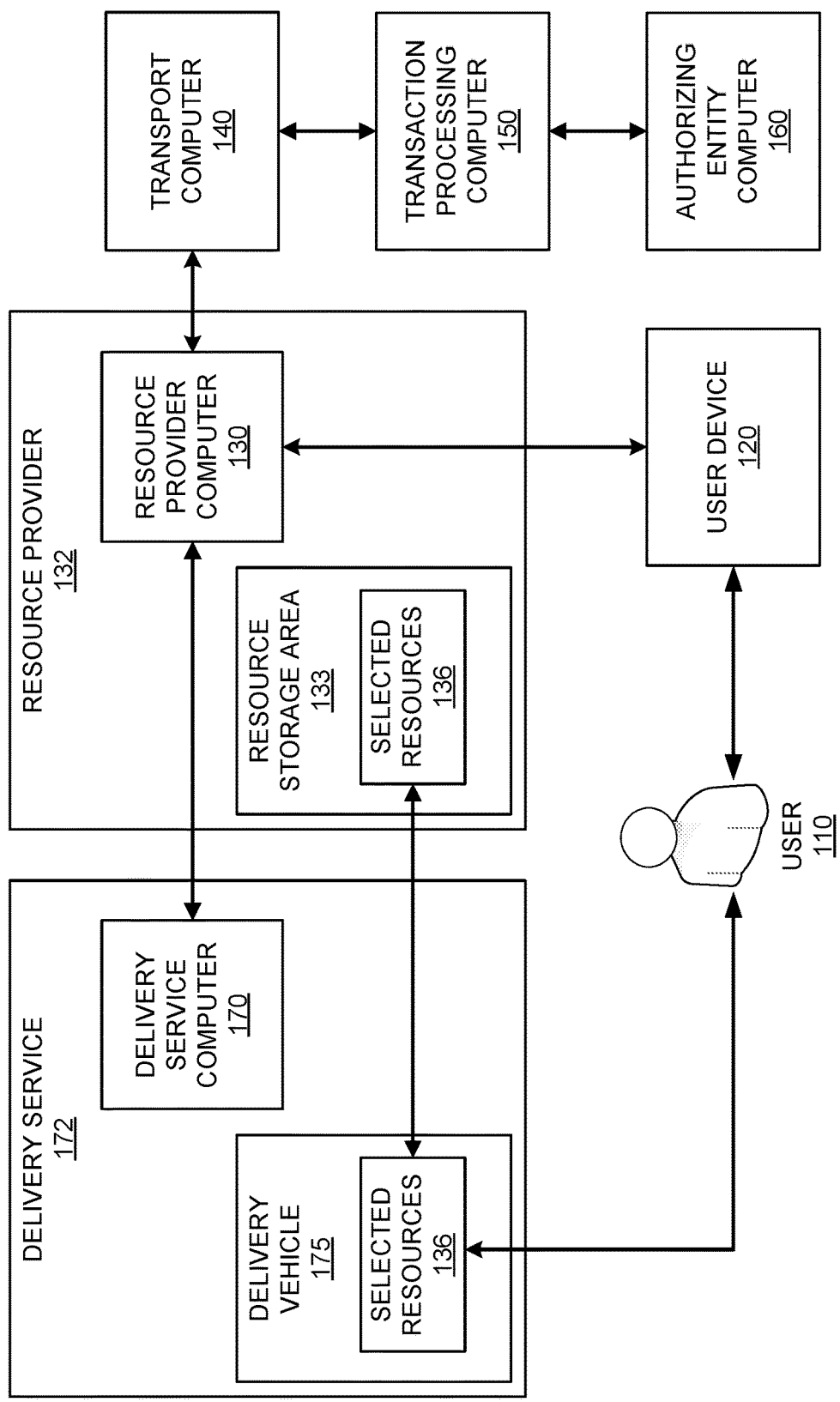
FIG. 1 shows a block diagram of a system according to an embodiment of the invention.

Embodiments of the present invention enable the pre-authorization of remote transactions such that resources can be delivered before the transaction is authorized. This enables a user to receive and inspect the delivered resources before committing to the transaction. After inspecting the resources, the user can decide to keep the resources, in which case the transaction can be authorized and a user's value can be transferred to the resource provider. If the user decides to return the resources, the transaction can be canceled and the user's value not transferred.

When a transaction is pre-authorized, a resource provider computer can store a record of the pre-authorized transaction with sufficient information (e.g., a transaction identifier) for following-up later to authorize or clear the transaction. For example, at a later time, a delivery service computer can inform the resource provider computer when the delivery is complete, and the resource provider computer can identify a user device associated with the transaction in the stored record. The resource provider computer can then communicate with the user device to prompt the user to inspect the delivered resources. The user can, via the user device, communicate with the resource provider computer to accept the resources. When the resources are accepted, the resource provider computer can proceed to process of the transaction. For example, the resource provider computer can use transaction data stored in the record (e.g., an amount, authorizing entity, transaction identifier, etc.) to send an authorization request message or a clearance request message. The resource provider computer can also update the record to indicate that the transaction has concluded.

It is difficult for a user to fully understand what a resource is like through online description and/or pictures. As a result, users can be dissatisfied with online-purchased products when they arrive. The possibility that an online resource will seem different in-person causes users to hesitate when purchasing resources online, and reduces online commerce. Embodiments of the invention solve this problem by improving the user's experience and the user's value security when ordering resources online. The user can have a resource delivered before having to actually pay for the resource. This simulates an in-store shopping experience for the user, as the user can physically inspect a resource (e.g., try on clothes or test-operate software) before paying for the resource. As a result, online transactions become more convenient and less risky for the user.

Another problem with current online transaction systems is that resources are often returned after being purchased. These returns result in a large amount of electronic processing for transaction reversals. Also, the user's funds can be tied up until the transaction reversal is complete, which can result in a significant amount of time where the funds are unusable (e.g., 60-90 days). Embodiments of the invention solve these problems by delaying authorization and value capture until after the user inspects the resource. If the user decides not to keep a resource after inspection, the resource can be returned without having to process a transaction reversal. A financial transaction does not need to be reversed because it was never authorized in the first place and funds were not yet transferred. Instead, a temporary hold on the user's account can be lifted. As a result, the extensive processing and communications needed for transaction reversals can be avoided, thereby improving efficiency and reducing bandwidth usage within the transaction system. Additionally, the user does not have to wait for funds to be returned to the user's account, as the funds were never removed in the first place.

There have been other attempts to solve the problem of a user's uncertainty in the quality of online resources. In one method, a user can order a resource over the Internet without purchasing the resource outright. Instead, the resource can be delivered, and the user can pay for the resource in-person when it is delivered. For example, the delivery person can carry a portable point-of-sale device (e.g., for swiping a credit card), or the user can give cash to the delivery person. However, this technique has several problems that are solved by embodiments of the present invention. For example, it is inconvenient and error-prone to depend on the user to successfully conduct a purchase with the delivery person at the time of delivery. The user may not be home when the delivery person arrives, the user may have misplaced a credit card or may not have cash on-hand, or the user may distrust the delivery person. In the case where the delivery person carries a portable point-of-sale device, the point-of-sale device could malfunction and thereby make the transaction impossible. Further, it is inconvenient for the delivery person to carry an extra device, and distributing devices to every delivery person would be a significant change to technological infrastructure and a burden to the delivery organization.

In contrast, embodiments of the present invention allow the user to provide payment information to the resource provider computer when initially ordering the resources online, and embodiments provide a direct line of electronic communication between the user and resource provider computer, such that the user can later confirm the payment directly with the resource provider computer. As a result, the user does not have to provide a credit card, cash, or other forms of payment to the delivery person, or otherwise establish trust in the delivery person. Additionally, the delivery person does not need to carry an extra device, the delivery process does not need to be otherwise modified to accommodate the delayed-authorization transaction, and thus the delivery service can proceed as usual.

Additionally, in some embodiments, the user may not even need to be home to receive the delivered resources. Instead, the delivery person can leave the package at the door, and the user can be allotted a certain timeframe to inspect the resources (e.g., 72 hours). After inspection, the user can (e.g., via a user device) communicate with the resource provider computer to indicate whether the resources are accepted. If accepted, the resource provider computer can process the transaction. If not accepted, the resource provider computer can release the pre-authorization hold and instruct the delivery service to collect the package for return. Thus, in some embodiments, there may be no need for the user and delivery person to be in the same place at the same time.

Prior to discussing specific embodiments of the invention, some terms may be described in detail.

A "value" may include an amount, an asset, or a set of information with worth. For example, a value can include an amount of currency, access rights, or login credentials. A value can change ownership by being transferred from a first owner to a second owner. Examples of value transfers include payment transactions where currency is transferred, credit transfers such as where game credits or mobile phone minutes are transferred, and property transfers where event tickets or property deeds are transferred.

A "resource" may include a product or commodity. A resource can be a physical substance or digital content. Examples of physical resources include items and materials, such as clothing articles, electronic hardware goods, furniture, automobiles, jewelry, etc. Examples of digital resources include digital audio files, digital video files, software such as anti-virus software and application software, etc.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "pre-authorization request message" may be a type of authorization request message. A pre-authorization request message typically seeks pre-authorization of a certain amount for a potential transaction. Receipt of the pre-authorization request message by an authorizing entity may cause the authorizing entity to "hold" the amount in the pre-authorization request message in the account of the user requesting pre-authorization. A pre-authorization request message can be similar to an authorization request message, but can further include a flag or data value associated with pre-authorization. Pre-authorization request messages can be used in situations where an actual amount of a transaction with a resource provider is not yet known (e.g., as in the case where a several resources are selected for delivery, but not all of the resources may be kept and purchased). A pre-authorization request message can also be referred to as an "authorization only" message, as the message can be sent only to authorize a hold on an account with the intent to wait until a later time to finalize the transaction amount and/or clear and settle the transaction. In some embodiments, a subsequent authorization request message for the same transaction may be sent later when the amount and resources for the actual transaction are known. The hold may be released and the transaction may be processed according to the amount in the subsequent authorization request message. The pre-authorization request message and the subsequent authorization request message may include a transaction identifier to link the two messages so that the authorizing entity computer knows that they are part of the same interaction. In some embodiments, the instead of sending a subsequent authorization request message, a clearance message can be used to communicate the final amount and/or resources.

A "pre-authorization response message" may be a type of authorization response message. In some cases, it may be an electronic message reply to a pre-authorization request message generated by an issuing financial institution or a transaction processing computer.

An "acceptance request message" may be an electronic message that requests whether a resource is accepted. In some embodiments, a resource provider computer sends an acceptance request message to a user device to prompt the user device to indicate whether one or more resources are accepted. The acceptance request message can include information about a set of resources, an amount for each resource, a total amount, a purchase date, information about time for submitting a response, a transaction identifier, a resource provider identifier, and any other suitable information. An acceptance request message can also serve to inform the user device that a package was delivered.

An "acceptance response message" may be a message that responds to an acceptance request. In some cases, it may be an electronic message reply to an acceptance request message, and it may be generated by a user device and sent to a resource provider computer. An acceptance response message can include information about a set of accepted resources, a set of rejected resources, a final transaction amount, a purchase date, a transaction identifier, a resource provider identifier, and any other suitable information.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a user device 120 operated by a user 110. The system 100 further comprises a resource provider computer 130, a transport computer 140, a transaction processing computer 150, an authorizing entity computer 160, and a delivery service computer 170, each of which may be embodied by one or more computers. The resource provider computer 130 can be operated by a resource provider 132 associated with a resource storage area 133. The delivery service computer 170 can be operated by a delivery service 172 associated with a delivery vehicle 175. The user device 120 may be in communication with the resource provider computer 130 and/or any other suitable computer in the system 100, for example to selected one or more resources 136. Also, the user device 120, the resource provider computer 130, the transport computer 140, the transaction processing computer 150, and the authorizing entity computer 160 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The system 100 allows the user 110 to use the user device 120 to transact for one or more resources over the Internet. In some embodiments, the transaction can be a payment transaction for a physical resource posted for sale, and the physical resource can be physically delivered (e.g., shipped or mailed). In other embodiments, the transaction can be a payment transaction for a digital resource, and the digital resource can be electronically delivered (e.g., downloaded). Additional possible transactions include an exchange of game credits for game software, mobile phone credits for access to a cellular network, or any other suitable transaction.

The user 110 can operate the user device 120 to interact with a resource provider's website or application to browse and select resources for purchase. When the user 110 selects a set of resources for purchase, the resource provider computer 130 can instruct the delivery service computer 170 to deliver the selected resources 136, and the resource provider 132 can provide the selected resources 136 to the delivery service 172 for delivery to the user 110. Upon delivery, the user device 120 can communicate with and inform the resource provider computer 130 whether the user 110 would like to keep the delivered resources.

Additionally, the resource provider computer 130 can communicate with a transaction processing system to pre-authorize, authorize, clear, and/or settle a payment transaction. For example, when the user 110 first selects the resources for delivery, the resource provider computer 130 can calculate a transaction amount and seek pre-authorization of the transaction amount on the user's payment account. Also, if the user 110 decides to retain the delivered resources, the resource provider computer 130 can communicate with the transaction processing system to authorize and/or clear the transaction amount on the user's payment account. Such transaction processing can involve communications and processes performed by, for example, the transport computer 140, the transaction processing network computer 150, and the authorizing entity computer 160.

Figure 2:
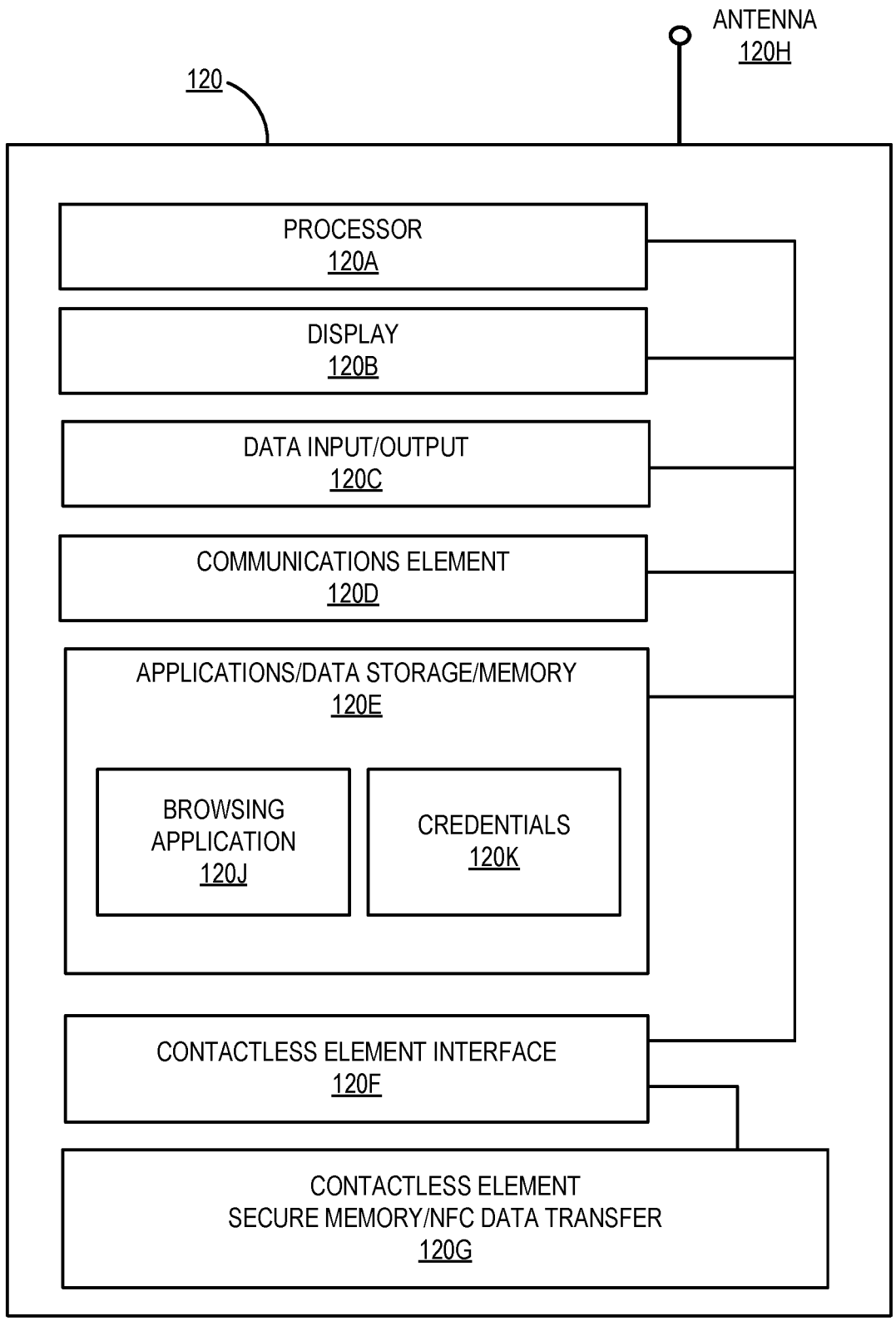
FIG. 2 shows a block diagram of an exemplary user device according to an embodiment of the invention.

The user device 120 can be any suitable type of device operated by the user 110. For example, the user device 120 can be a desktop computer, a laptop computer, a tablet computer, or a mobile device. An example of the user device 120 in the form of a mobile device, according to some embodiments of the invention, is shown in FIG. 2. The user device 120 may include circuitry that is used to enable certain device functions, such as telephony. The functional elements responsible for enabling those functions may include a processor 120A that can execute instructions that implement the functions and operations of the device. The processor 120A may access memory (or another suitable data storage region or element) to retrieve instructions or data used in executing the instructions, such as mobile applications. The data input/output elements 120C, such as a keyboard or touchscreen, may be used to enable a user to operate the user device 120 and input data (e.g., user authentication data). The data input/output elements 120C may also be configured to output data (via a speaker, for example). The display 120B may also be used to output data to a user. The communications element 120D may be used to enable data transfer between user device 120 and a wired or wireless network (via antenna 120H, for example) to assist in connectivity to the Internet or other network, and enabling data transfer functions. The user device 120 may also include contactless element interface 120F to enable data transfer between contactless element 120G and other elements of the device, where contactless element 120G may include a secure memory and a near field communications data transfer element (or another form of short range communications technology). Examples of a mobile device that may be used in accordance with embodiments of the present invention include a cellular phone, a key fob, a wearable device (smart watches, fitness bands, ankle bracelets, rings, earrings, etc.), a vehicle such as a car with remote communication capabilities, a PDA, a net book, a personal music player, a hand-held specialized reader, etc.

The memory 120E may comprise a browsing application 120J, payment credentials 120K, and any other suitable module or data. The user device 120 may have any number of mobile applications installed or stored on the memory 120E and is not limited to that shown in FIG. 2. The memory 120E may also comprise code, executable by the processor 120A for implementing a method comprising receiving from a user, a selection of one or more resources to be delivered to the user for a transaction; receiving, from the user, an indication to pre-authorize the transaction; sending a request to pre-authorize the transaction for the one or more resources to a resource provider computer, the resource provider computer thereafter initiating a pre-authorization request message with a value for the transaction to an authorizing entity computer, which pre-authorizes the transaction and holds the value, and transmits a pre-authorization response message back to the resource provider computer; receiving an acceptance request message prompting the user device to indicate that the one or more resources were delivered and are accepted; displaying, to the user, a prompt to indicate whether the delivered one or more resources are accepted; receiving, from the user, an indication that at least one of the delivered one or more resources are accepted; and sending an acceptance response message indicating that at least one of the delivered one or more resources are accepted, the resource provider computer thereafter transmitting a subsequent message to the authorizing entity computer or a processing network computer to process the transaction for the value or for less than the value.

The browsing application 120J may provide a user interface for the user 110 to browse resources, select resources, order resources for delivery, and confirm purchase of delivered resources. In some embodiments, the browsing application 120J can be a web browser by which the user device 120 can access a resource provider 132 website. In other embodiments, the browsing application 120J can be a shopping application associated with the resource provider 132.

The user device 120 can store and/or access payment credentials 120K (e.g., in a digital wallet). The payment credentials 120K can include any suitable credential that can be used to conduct a payment transaction. Such information may be directly related to an account or may be derived from information related to the account (e.g., a payment account and/or a payment device associated with the account). Examples of payment credentials may include a PAN (primary account number or "account number"), user name, expiration date, and verification values such as CVV (card verification value), dCVV (dynamic card verification value), CVV2 (card verification value 2), CVC3 card verification values, etc. An example of a PAN is a 16-digit number, such as "4147 0900 0000 1234." The payment credentials 120K can also include a payment token, which may be a substitute for PAN. The user device 120 can further store personal information such as a name, address, email address, phone number, or any other suitable user 110 identification information.

In some embodiments, the user device 120 can provide (e.g., populate into a payment field) the payment credentials 120K to the browsing application 120J for a delivery order and/or purchase. Alternatively, the user 110 can manually enter payment information (e.g., type a credit card PAN) into a checkout webpage.

The user 110 can operate multiple user devices 120. For example, the user 110 may utilize a desktop computer to initially select and order resources. The user 110 may then user a mobile phone to accept or reject delivered resources. For example, the user 110 can provide a phone number when ordering resources via the desktop, and the resource provider computer 130 can send an acceptance request message to the provided phone number when the resources are delivered.

Referring back to FIG. 1, the resource provider 132 may be an entity that can provide a resource such as goods, services, information, and/or access. Examples of a resource provider 132 include merchants, game servers, access devices, secure data access points, etc. A merchant may typically be an entity that engages in transactions and can sell goods or services, or provide access to goods or services.

The resource provider 132 may possess an inventory of resources, which can be located in a resource storage area 133 such as a warehouse or a storefront. When the user 110 selects resources for purchase, the selected resources 136 can be obtained from the resources storage area 133 for delivery. Additionally, the resource provider 132 can operate a resource provider computer 130 to provide an online shopping website and/or a mobile application so that users can purchase goods.

Figure 3:
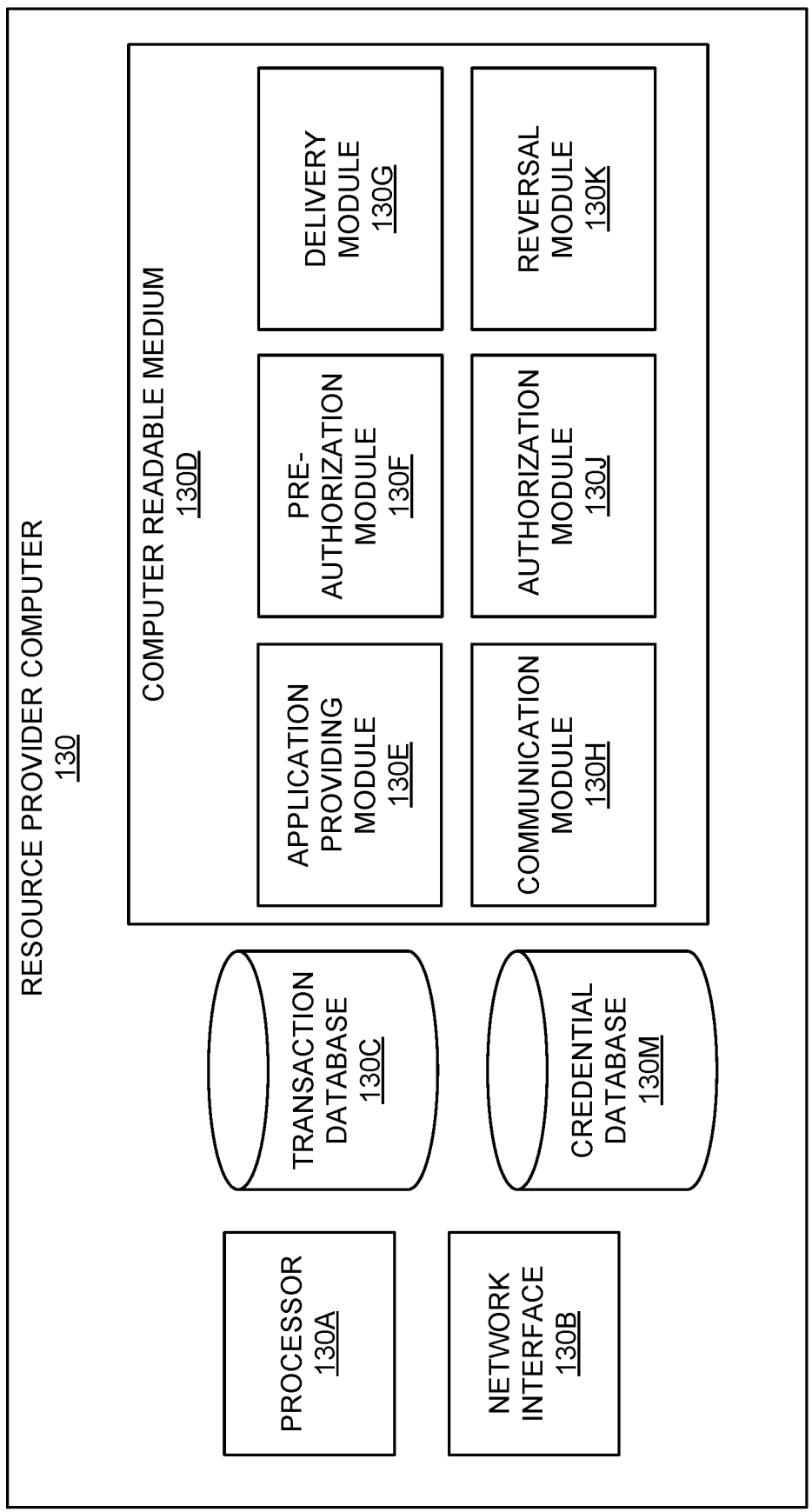
FIG. 3 shows a block diagram of a resource provider computer according to an embodiment of the invention.

An example of the resource provider computer 130, according to some embodiments of the invention, is shown in FIG. 3. The resource provider computer 130 comprises a processor 130A, a network interface 130B, a transaction database 130C, a credential database 130M, and a computer readable medium 130D.

The transaction database 130C can store information about transactions being processed, such as transactions that have been pre-authorized but not yet confirmed or fully authorized. For example, for a given transaction, the transaction database 130C can store a transaction record including a transaction identifier, information about the user 110 (e.g., a name and address), information about the user device 120 (e.g., a phone number, IP address, or email address), information about one or more resources (e.g., a serial number, price per unit, item type, and quantity), a total value for the transaction, an authorization code, payment credentials provided for the transaction, a delivery tracking number, timeframe information (e.g., pre-authorization valid for 10 days), and/or any other suitable information.

The credential database 130M can store payment credentials. For example, the resource provider 132 can act as a card-on-file merchant that stores payment credentials for specific users. Thus, the credential database 130M can include the user's payment credentials (e.g., a PAN or token) and utilize them for the user's transactions. In some embodiments, the credential database 130M can temporarily store payment credentials. For example, the user's credentials can be stored during pre-authorization such that they can be used for a subsequent authorization or clearance, but then can be erased after the subsequent authorization or clearance is complete.

The computer readable medium 130D may comprise an application providing module 130E, a pre-authorization module 130F, a delivery module 130G, a communication module 130H, an authorization module 130J, a reversal module 130K, and any other suitable software module. The computer readable medium 130D may also comprise code, executable by the processor 130A for implementing a method comprising receiving, from a user device, a request to pre-authorize a transaction for one or more resources; transmitting, to an authorizing entity computer, a pre-authorization request message for the transaction, the pre-authorization request message indicating a value for the transaction, and the authorizing entity computer thereafter pre-authorizing the transaction and holding the value; receiving a pre-authorization response message from the authorizing entity computer indicating that the transaction is pre-authorized; transmitting an instruction to deliver the one or more resources; receiving a message indicating that the one or more resources were delivered; and transmitting, to the authorizing entity computer or a processing network computer, a subsequent message to process the transaction for the value or for less than the value.

The application providing module 130E may comprise code that causes the processor 130A to provide an application for browsing, selecting, ordering, and/or purchasing resources. For example, the application providing module 130E may contain logic that causes the processor 130A to transmit an application to the user device 120. In some embodiments, the resource provider computer 130 can provide a shopping webpage on the Internet in addition to or instead of providing a downloadable application.

The pre-authorization module 130F may comprise code that causes the processor 130A to obtain pre-authorization for a transaction. For example, the pre-authorization module 130F may contain logic that causes the processor 130A to initiate a transaction pre-authorization process by generating and sending a pre-authorization request message for a transaction, as well as receiving a subsequent pre-authorization response message. The pre-authorization module 130F can also, in conjunction with the processor 130A, store a transaction record for a transaction.

The delivery module 130G may comprise code that causes the processor 130A to instruct delivery of one or more ordered resources. For example, the delivery module 130G may contain logic that causes the processor 130A to send a delivery order to the delivery service computer 170 with information about one or more ordered resources and a delivery destination. The delivery module 130 can also, in conjunction with the processor 130A, cause the selected resources 136 to be obtained from the resource storage area 133 and prepared for shipping (e.g., by sending an instruction to a delivery-preparation area of a warehouse). For example, a package can be prepared including one or more resources. Further, the delivery module 130 can, in conjunction with the processor 130A, receive a notification from the delivery service computer 170 that a package was delivered, and can otherwise communicate with the delivery service computer 170 to inquire about delivery status.

The communication module 130H may comprise code that causes the processor 130A to communicate with the user device 120 about a transaction. For example, the communication module 130H may contain logic that causes the processor 130A to receive a request from the user device 120 to purchase one or more resources (or to order resources for delivery), to communicate with the user device 120 after delivery to determine whether the delivered resources are accepted.

The authorization module 130J may comprise code that causes the processor 130A to obtain authorization for a transaction. For example, the authorization module 130J may contain logic that causes the processor 130A to initiate a transaction authorization process by generating and sending an authorization request message for a transaction, as well as receiving a subsequent authorization response message. The authorization request message can include information associated with the pre-authorization, such as a transaction identifier, an authorization code, a merchant identifier, and payment credentials. The authorization request message can also include a transaction amount, which can be the same as the amount previously indicated in the pre-authorization request message (e.g., in the case where the user 110 accepts all the delivered resources) or different than the amount previously indicated in the pre-authorization request message (e.g., in the case where the user 110 does not accept all of the delivered resources). If the user 110 does not accept any delivered resources, the authorization module 130F can, in conjunction with the processor 130A, send an authorization release message to release the hold on the user's account.

The reversal module 130K may comprise code that causes the processor 130A to process transaction reversals. For example, the reversal module 130K may contain logic that causes the processor 130A to generate and send a transaction reversal request message, for example if the user 110 decides to return a resource after having previous accepted and purchased the resource.

Referring back to FIG. 1, the delivery service 172 may be an entity that can deliver a resource. Examples of a delivery service 172 include a government postal service, a local private shipping company, and an international freight organization. Additional examples include software distribution server computers that can electronically transmit a digital resource to the user computer 120 without performing a physical package delivery.

The delivery service 172 may utilize one or more delivery vehicles 175, such as one or more trucks, trains, ships, planes, cars, personnel, and/or other suitable delivery tools. The delivery vehicle 175 can obtain one or more selected resources 136 (e.g., packed in one or more packages) from the resource provider's resource storage area 133, and then deliver the selected resources 136 to the user 110 (e.g., at the user's home).

The delivery service 172 can operate a delivery service computer 170 which can communicate with the resource provider computer 130 to receive delivery instructions, send updates about completed deliveries, and/or receive instructions for collecting resources for return to the resource provider 132.

In some embodiments, the resource provider 132 can operate its own delivery service. In this case, the resource provider 132 and delivery service 172 can be combined into a single entity.

The transport computer 140 may be associated with an acquirer, which may typically be a business entity (e.g., a commercial bank) that has a business relationship with a particular merchant or other entity. Some entities can perform both issuer and acquirer functions. Some embodiments may encompass such single entity issuer-acquirers. The transport computer 140 may be more specifically referred to as an acquirer computer.

The transaction processing computer 150 may be disposed between the transport computer 140 and the authorizing entity computer 160. The transaction processing computer 150 may include data processing subsystems, networks, and operations used to support and deliver authorization services, exception file services, and clearing and settlement services. For example, the transaction processing computer 150 may comprise a server coupled to a network interface (e.g., by an external communication interface), and databases of information. The transaction processing computer 150 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 150 may use any suitable wired or wireless network, including the Internet.

The authorizing entity computer 160 may be associated with an authorizing entity, which may be an entity that authorizes a request. An example of an authorizing entity may be an issuer, which may typically refer to a business entity (e.g., a bank) that maintains an account for a user. An issuer may also issue and manage a payment account associated with the user device 120. Managing a payment account can include authorizing a transaction on the account, as well as placing a hold on the account in response to a pre-authorization request.

The transaction processing computer 150, the transport computer 140, and the authorizing entity computer 160 may operate suitable routing tables to route authorization request messages and/or authorization response messages using payment credentials, merchant identifiers, or other account identifiers.

Figure 4:
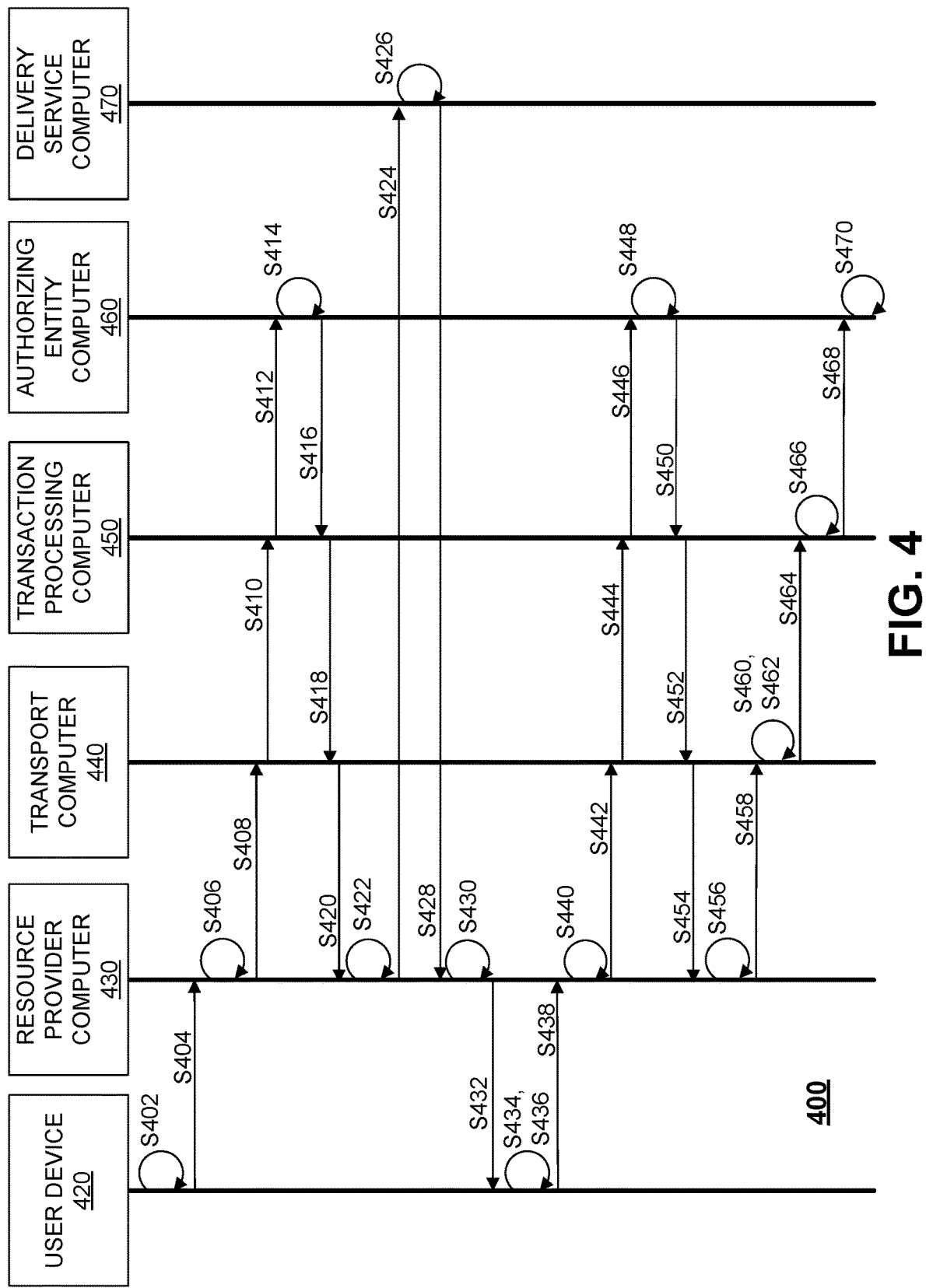
FIG. 4 shows a flow diagram illustrating a first method for pre-authorizing a delivery transaction, according to embodiments of the invention.

A method 400 according to embodiments of the invention can be described with respect to FIG. 4. Some elements in other Figures are also referred to. The steps shown in the method 400 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an Internet protocol (IP) address, or a uniform resource locator (URL). In some embodiments, a request or response may comprise a mix of different message types, such as both email and SMS messages.

A user can use a user device 420 to browse a website or application showing different types of resources offered for sale by a resource provider. At step S402, the user can select one or more resources. The user can also select an option to pay for the resources after the resources are delivered. Additionally, the user can provide payment credentials for the possible future purchase.

At step S404, the user device 420 can transmit an order request to the resource provider computer 430. The order request can include information about the selected resources, the user's payment credentials, and an indication that the transaction should not be completed (e.g., the user should not be charged) until after the resources are delivered. The order request can also include information about the user and/or user device 420, such as a delivery address and contact information for future transaction communications.

At step S406, the resource provider computer 430 can generate a pre-authorization request message for the transaction. The resource provider computer 430 can determine the total transaction cost based on the selected resources, and can include the total transaction cost as a pre-authorization amount in the authorization request message. The message can also include the user's payment credentials, a resource provider identifier, and an indicator that the request is just for pre-authorization (e.g., an account hold) and that a subsequent message will follow for full authorization and/or clearance.

In some embodiments, the pre-authorization request message can include an amount of time requested for the pre-authorization to remain valid. For example, the resource provider computer 430 may request that the account hold remains active for 20 days before being released, such that the resource provider computer 430 can send a follow-up authorization request message (or clearance message) anytime within 20 days. For example, 20 days may be sufficient time for the delivery service to deliver the resources, for the user to decide whether to accept the resources, and for the resource provider computer 430 to submit a follow-up message. A longer hold is beneficial to the resource provider as the transaction value is guaranteed for a longer time, but a longer hold is not desirable for the user, as the user may wish to use the account value for other transactions (e.g., should a problem arise with the current transaction).

The resource provider computer 430 can also store a transaction record for future reference. The transaction record can include, for example, information about the selected resources, contact information for the user (e.g., a user device 120 phone number and delivery address), the transaction amount, and/or a transaction identifier.

At step S408, the resource provider computer 430 can transmit the pre-authorization request message to the transport computer 440. At step S410, the transport computer 440 can forward the pre-authorization request message to the transaction processing computer 450. At step S412, the transaction processing computer 450 can forward the pre-authorization request message to the authorizing entity computer 460. Embodiments allow any of these computers to store a transaction record based on the pre-authorization request message.

At step S414, the authorizing entity computer 460 can determine whether or not to pre-authorize the transaction. For example, the authorizing entity computer 460 can identify the user's account based on the payment credentials, and can determine whether the account has sufficient balance (e.g., for a debit account) or credit (e.g., for a credit account) to complete the transaction. The authorizing entity computer 460 can also perform risk analyses.

If the authorizing entity computer 460 determines to pre-authorize the transaction, the authorizing entity computer 460 can place a hold on the user's account. For example, a value (e.g., of funds or credit) equal to the pre-authorization amount can be reserved in the user's account, such that the value cannot be used for other transactions until the hold is released. The authorizing entity computer 460 can set the hold for any suitable amount of time, such as 5 days, 10 days, 20 days, or 30 days. If a subsequent authorization request message or clearance message is received after the hold expires, the authorizing entity computer 460 may still process the transaction, but it is possible that funds may have been utilized for another transaction.

At step S416, the authorizing entity computer 460 can generate and transmit a pre-authorization response message to the transaction processing computer 450 indicating whether the transaction was pre-authorized. The pre-authorization request message can also include an authorization code, information about the duration of time that the pre-authorization will remain valid, and a transaction identifier.

At step S418, the transaction processing computer 450 can forward the pre-authorization response message to the transport computer 440. At step S420, the transport computer 440 can forward the pre-authorization response message to the resource provider computer 430.

At step S422, the resource provider computer 430 can determine whether the transaction was pre-authorized. If it is pre-authorized, the resource provider computer 430 can initiate a delivery process. For example, the resource provider computer 430 can generate a delivery order such that the selected resources are gathered from a resource storage area, packaged, and otherwise prepared for shipping.

The resource provider computer 430 can also add information about the pre-authorization response message to the transaction record, such as an authorization code and/or a transaction identifier. In some embodiments, a transaction identifier can be generated by the transaction processing computer 450 or the authorizing entity computer 460 during the pre-authorization processing. Such a transaction identifier can be returned to the resource provider computer 430 in the pre-authorization response message. Regardless of which computer generates the transaction identifier, the same transaction identifier can be shared among the resource provider computer 430, the transport computer 440, the transaction processing computer 450, and the authorizing entity computer 460 such that each entity can communicate about the transaction and identify a transaction record during subsequent communications.

At step S424, the resource provider computer 430 can transmit a delivery instruction message to the delivery service computer 470. The delivery instruction message can include the delivery address provided by the user, as well as any suitable information about the selected resources, the package (e.g., a number of packages, weight, and size), or other delivery conditions.

Upon receipt of the delivery instruction message, the delivery service computer 470 can generate and assign a delivery order identifier, such as a tracking number, for the delivery. The delivery service computer 470 can also transmit the delivery order identifier to the resource provider computer 430. The resource provider computer 430 can add the delivery order identifier to the transaction record, such that the transaction can be identified when the delivery is completed.

At step S426, the delivery service computer 470 can cause the delivery to be performed. For example, the delivery service computer 470 can transmit instructions to a delivery personnel or vehicle to collect the package (e.g., with the selected resources) from the resource provider, and then deliver the package to the user (e.g., at the address indicated in the delivery instruction message).

When the package is delivered, the delivery personnel can log the delivery as complete. For example, the delivery personnel can use a mobile device to send a completion report back to the delivery service computer 470, or the delivery personnel can check in at a report station upon return to a dispatch center. In some embodiments, the delivery personnel can use a mobile device to scan a barcode or QR code (e.g., encoded with a delivery order identifier) on the package when dropping off the package, and the mobile device can then automatically transmit a delivery complete message to the delivery service computer 470.

In further embodiments, a location tracking device (e.g., a GPS transceiver) can be placed on the package such that the package location can be monitored by the delivery service computer 470. The delivery service computer 470 can mark the delivery as complete when the package location is at or near (e.g., within 10 feet, 50 feet, or 100 feet) of the delivery destination address. Additionally, the delivery service computer 470 can track the delivery personnel's location (e.g., via a GPS device in the delivery vehicle or a mobile device), and the delivery service computer 470 can mark the delivery as complete when the delivery personnel has visited and then disembarked from the delivery destination address.

At step S428, the delivery service computer 470 can transmit a delivery complete message to the resource provider computer 430. The delivery complete message can identify the delivery order and/or the transaction associated with the delivery, for example by including the delivery order identifier and/or the transaction identifier. The completion message can also include information about the delivery address, the time of delivery, and verification information such as a photograph or a user signature.

At step S430, the resource provider computer 430 can receive the delivery complete message and identify an associated transaction. For example, the resource provider computer 430 can identify a transaction record including the delivery order identifier (and/or other information sent in the delivery complete message). The resource provider computer 430 can then obtain user contact information stored in the transaction record, such as a phone number or application identifier associated with the user device 420.

At step S432, the resource provider computer 430 can generate and transmit an acceptance request message to the user device 420. The message can be transmitted as an in-app message, a push notification, an SMS, an email, or any other form. The acceptance request message can prompt the user device 420 to indicate whether the user would like to keep and purchase the delivered resources, or instead return the resources and cancel the transaction. The message can also serve to inform the user that the delivery was complete (e.g., in case the user was not home when the package was delivered), and can include transaction details to remind the user about the order (e.g., an order date, an amount, a merchant name, etc.). Additionally, the message can include descriptive information about the transaction and delivery, such as information about each resource included in the package (e.g., a resource name, type, size, color, and quantity).

In some embodiments, the acceptance response message can provide a timeframe for response. For example, the user may be given a certain amount of time (e.g., 1 hour, 3 hours, 12 hours, 1 day, 3 days, or 5 days) to accept or reject the delivered resources. If the timeframe is exceeded, the resource provider computer 430 may proceed to charge the user for the delivered resources (e.g., by sending a second authorization request message).

At step S434, the user device 420 can display the received acceptance request message, or otherwise display information about the order and/or prompt the user to indicate whether the resources are accepted. For example, the user device 420 can display a pop-up message on the home screen with "accept" and "return" selection options. The user device 420 can also display a text message prompting the user to respond with another text message stating "accept" or "return." Additionally, the user device 420 can activate a mobile application that can display information about the transaction along with an "accept" or "return" options for each resource.

In response to the delivery and/or the acceptance request message, the user can inspect the delivered resources. As examples, the user can visually assess a delivered clothing item and try it on to test if it fits, the user can sit on a delivered chair to feel whether it is comfortable, the user can test a delivered kitchen knife to examine its performance, and the user can try out a software application to judge its design and practicality. The user can also weigh each resource's price versus the benefit it provides.

After inspecting and considering each resource, the user can decide whether to keep or return each of the delivered resources. For example, the user may decide to return and not purchase a clothing item due to an improper fit, but to keep and purchase a kitchen knife because it effectively cut vegetables during testing and is competitively priced.

At step S436, the user device 420 can receive one or more user selections of resources to accept and/or return. For example, the user can select a "keep" option displayed next to an icon or information associated with a kitchen knife, and the user can select a "return" option displayed next to an icon or information associated with a clothing item.

Additionally, the user device 420 can receive a user's input or selection of payment credentials for the purchase. In some embodiments, the user can select the same payment credentials as selected in step S404 to confirm the use of that payment account for the purchase. In other embodiments, the payment credentials input at this point can be different than the payment credentials provided for the pre-authorization at step S404 (e.g., and a new authorization can take place for the new account).

At step S438, the user device 420 can transmit an acceptance response message to the resource provider computer 430. The acceptance response message can indicate which resources are accepted and which resources are rejected by the user. Then, having received confirmation to purchase one or more of the delivered resources, the resource provider computer 430 can proceed to process the transaction and obtain the transaction value from the user's account.

At step S440, the resource provider computer 430 can generate an authorization request message that is subsequent to the pre-authorization request message. The resource provider computer 430 can determine the total transaction cost based on which of the selected resources are being kept and purchased (e.g., by summing the prices of the kept resources), and can include the total transaction cost as an authorization amount (e.g., the final amount) in the authorization request message. The authorization amount can be less than the pre-authorization amount, as the authorization amount may be for fewer resources than the pre-authorization amount. If the user decided to keep all of the delivered resources, the total transaction cost and authorization amount can be the same as the pre-authorization amount.

The authorization request message can also include a flag indicating that it is associated with a previous pre-authorization, and can include information identifying the previous pre-authorization such as a transaction identifier, the user's payment credentials, a resource provider identifier, the previous pre-authorization amount, an authorization code, and/or a date and time of the previous pre-authorization. In some embodiments, the authorization request message can also include an indication to release the hold on the user's account from the pre-authorization, or to at least release the portion of the hold corresponding to resources that are being returned and not purchased.

Additionally, the resource provider computer 430 can update the transaction record to indicate which resources were accepted and which were returned, and to indicate the new transaction amount.

At step S442, the resource provider computer 430 can transmit the authorization request message to the transport computer 440. At step S444, the transport computer 440 can forward the authorization request message to the transaction processing computer 450. At step S446, the transaction processing computer 450 can forward the authorization request message to the authorizing entity computer 460. Embodiments allow any of these computers to update a local transaction record based on the authorization request message, and to identify the transaction and/or route the authorization request message based on the transaction identifier.

At step S448, the authorizing entity computer 460 can identify the user's account and the pre-authorization hold value by matching the transaction identifier, the payment credentials, and/or any other suitable information included in the authorization request message with a transaction record stored at step S414. The authorizing entity computer 460 can thereby connect the authorization request message to the previous pre-authorization. The authorizing entity computer 460 can then determine whether to authorize the transaction.

In some embodiments, the authorizing entity computer 460 may release the pre-authorization hold when the authorization request message is received and approved, and the authorizing entity computer 460 may create a new authorization hold on the user's account for the authorization amount. Alternatively, the authorizing entity computer 460 can update or convert the pre-authorization hold into a normal authorization hold. This can include updating the hold to indicate that the value is ready for clearing and settlement (e.g., additional authorization messages are not needed before settlement can happen), and/or reducing the time duration of the hold (e.g., from 30 days to 3 days) as the authorization may be expected to settle within a few days. In any case, the authorizing entity computer 460 can prepare the transaction value for clearing and settlement. If the authorization amount is less than the pre-authorization amount, authorizing entity computer 460 can release a portion of the hold equal to the difference between the authorization amount and the pre-authorization amount (e.g., to release the value for the resources being returned).

At step S450, the authorizing entity computer 460 can generate and transmit an authorization response message to the transaction processing computer 450 indicating whether the transaction was authorized. The authorization request message can also include a new (e.g., second) authorization code.

At step S452, the transaction processing computer 450 can forward the authorization response message to the transport computer 440. At step S454, the transport computer 440 can forward the authorization response message to the resource provider computer 430.

At step S456, the resource provider computer 430 can update the transaction record based on the authorization response message. For example, the resource provider computer 430 can mark the transaction as ready for clearing and settlement.

Once authorization is completed, a clearing and settlement process can be performed between the transport computer 440, the transaction processing computer network 450, and the authorizing entity computer 460. In some embodiments, at step S458, the resource provider computer 430 can send a capture request message to the transport computer 440, which can serve as a request for the transport computer 440 to initiate a clearing and settlement process for the transaction.

At step S460, the transport computer 440 can generate a clearance message for the transaction. The clearance message can include the transaction identifier, the authorization code, the user's payment credentials, a resource provider account identifier, and/or any other suitable information used for clearing and settling the transaction.

In some embodiments, the transport computer 440 may submit the clearance message for processing together with other clearance messages for other transactions. For example, at step S462, the transport computer 440 can create a clearance batch file including multiple clearance messages, such as all clearance messages associated with transactions authorized during that day. The clearance batch file can include all transactions associated with the transport computer 440, and thus can include transactions conducted with other users and/or other resource providers that are associated with the transport computer 440. At step S464, the transport computer 440 can transmit the clearance batch file including the transaction clearance message to the transaction processing computer 450.

Then, at step S466, the transaction processing computer 450 can create a second clearance batch file that just includes clearance messages addressed to the authorizing entity computer 460. For example, the transaction processing computer 450 can parse the first clearance batch file for transactions associated with the authorizing entity computer 460, and can add those identified transactions to the second clearance batch file while ignoring transactions associated with other authorizing entities.

Additionally, the transaction processing computer 450 may receive additional batch files from other transport computers including transactions with other resource providers. The transaction processing computer 450 can also parse these other batch files for clearance messages associated with the authorizing entity computer 460, and can add any identified clearance messages to the second clearance batch file. At step S468, the transaction processing computer 450 can transmit the second clearance batch file to the authorizing entity computer 460.

At step S470, the authorizing entity computer 460 can identify the clearance message from the second clearance batch file, and can identify the stored transaction record (e.g., based on the transaction identifier). The authorizing entity computer 460 can then debit the transaction value from the user's account, as well as remove the hold on the account.

Additional steps (not shown in FIG. 4) can be performed to complete settlement of the transaction value between the authoring entity computer and the transport computer. For example, the transaction processing computer 450 can calculate a net position between the authoring entity computer 460 and the transport computer 440 by combining the values of all transactions conducted between various user accounts and resource provider accounts managed by the authoring entity computer 460 and the transport computer 440. The transaction processing computer 450 can then coordinate net settlement between the authoring entity computer 460 and the transport computer 440 by transferring the net value between their respective settlement accounts at a settlement bank. In some embodiments, multilateral settlement can take place, where the net positions are calculated between each bank and the entire network.

In any case, once settlement is completed between the authorizing entity computer 460 and the transport computer 440, the transport computer 440 can credit the transaction value to the resource provider's account, thereby completing the transfer of the transaction value from the user to the resource provider.

The method 400 as described above includes two separate authorization messages. First, a pre-authorization request message is sent at step S408. Second, an authorization request message is sent at step S442. Then, when authorization is complete, a clearance process is started at step S458. While this flow achieves the objective of allowing a user to order and receive resources before having to pay for the resources, some embodiments allow the flow to proceed differently. For example, in some embodiments, the second authorization message (e.g., the authorization request message is sent at step S442) can be omitted, and the purposes of the second authorization message can instead be attained by the clearance message. Since the pre-authorization request message can establish a hold on the user's account, an additional authorization request may be unnecessary, and the held value can be claimed directly through clearance.

Figure 5:
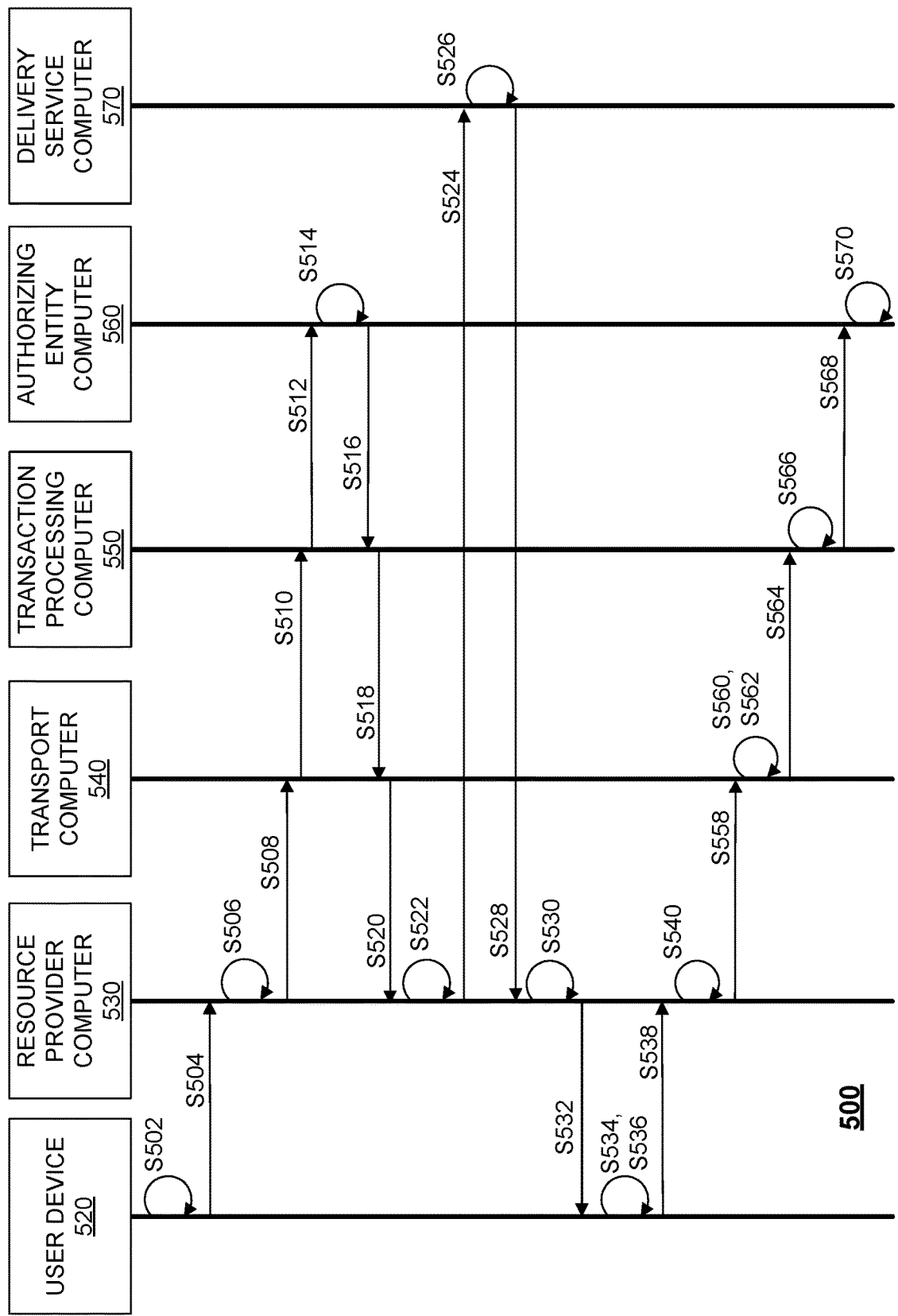
FIG. 5 shows a flow diagram illustrating a second method for pre-authorizing a delivery transaction, according to embodiments of the invention.

An example alternative method 500 of this variety can be described with respect to FIG. 5. Some elements in other Figures are also referred to. The steps shown in the method 500 may be performed sequentially or in any suitable order in embodiments of the invention. In some embodiments, one or more of the steps may be optional.

FIG. 5 illustrates steps S502-S538. In some embodiments, these steps may be the same as or substantially similar to steps S402-S438 in FIG. 4, and the descriptions of those steps are not repeated in the description of FIG. 5.

Having delivered the resources and received confirmation to purchase one or more of the delivered resources (e.g., at step S538), the resource provider computer 430 can proceed to process the transaction and obtain the transaction value from the user's account. In some embodiments, the resource provider computer 530 can continue directly to claim the transaction value through clearing and settlement, and may not send a second authorization request message.

At step S540, the resource provider computer 530 can generate a capture request message for claiming the transaction value. The capture request message can include information identifying the previous pre-authorization such as a transaction identifier, the user's payment credentials, a resource provider identifier, the previous pre-authorization amount, an authorization code, a date and time of the previous pre-authorization, a flag indicating that it the message is associated with a previous pre-authorization, and/or any other suitable information used for clearing and settling the transaction.

Additionally, the capture request message can include a final transaction value to be claimed. In some embodiments, the final transaction value can be the same as the pre-authorization amount and hold amount (e.g., if the user decided to keep all of the delivered resources). In other embodiments, the final transaction value can be the different than the pre-authorization amount and hold amount (e.g., if the user decided to return one or more of the delivered resources).

In some embodiments, the capture request message can also include an indication to release the hold on the user's account from the pre-authorization, or to at least release the portion of the hold corresponding to resources that are being returned and not purchased.

Additionally, the resource provider computer 530 can update the transaction record to indicate which resources were accepted and which were returned, and to indicate the final transaction amount being obtained through clearance and settlement.

Then, the resource provider computer 530 can send the capture request message to the transport computer 540 at step S558, which can be the same as or similar to step S458. FIG. 5 then illustrates steps S560-S568. In some embodiments, these steps may be the same as or substantially similar to steps S460-S468 in FIG. 4, and the descriptions of those steps are not repeated in the description of FIG. 5.

At step S570, the authorizing entity computer 560 can identify the user's account and the pre-authorization hold value by matching the transaction identifier, the payment credentials, and/or any other suitable information included in the clearance message with a transaction record stored at step S514. The authorizing entity computer 560 can thereby connect the clearance message to the previous pre-authorization.

The authorizing entity computer 560 can then determine whether to approve of the clearance request and settle the transaction. If the authorizing entity computer 560 approves, the authorizing entity computer 560 can debit the final transaction value from the user's account. Additionally, if the final transaction value is less than the pre-authorization hold amount, the authorizing entity computer 560 can remove any remaining amount of hold the account on for this transaction (e.g., to release the value for the resources being returned).

As mentioned above, additional steps (not shown in FIG. 5) can be performed to complete settlement of the transaction value between the authoring entity computer and the transport computer.

Thus, in some embodiments, the second authorization request message can be skipped, and the clearance message can achieve the purposes of the second authorization request message. In some embodiments, the method 500 may be utilized when the user accepts all resources such that the final transaction value is the same as the pre-authorization hold, and the method 400 may be utilized when the user returns one or more resources such the final transaction value is different than the pre-authorization hold (e.g., so a second authorization process can be used to authorize the new transaction amount).

The methods above primarily described the case where the user decides to accept at least some of the delivered resources. However, it is possible that the user may decide to return all of the delivered resources (e.g., at step S436 in FIG. 4). In this case, the resource provider computer 430 can send a message to the authorizing entity computer 460 indicating that the account hold should be released. This message can take the form of an authorization request message with a flag for releasing the hold, or can be another type of message such as an authorization release message or transaction void message. Alternatively, the resource provider computer 430 may not send any additional messages, and then the authorization entity computer 460 can remove the hold once the hold time-period expires (e.g., after 5 days, 10 days, 30 days, 60 days, 90 days, etc.).

Additionally, if the user decided to return one or more resources, the resource provider computer 430 may send another delivery message to the delivery service computer 470. This subsequent message can be a collection instruction message that instructs the delivery service to go back to the user (e.g., at the delivery address) to obtain the resources that the user has rejected, and to then bring those resources back to the resource provider.

After the method is finished and the transaction is complete, the user may still decide to return a resource. For example, after wearing a clothing item for a day, the user may determine that it was uncomfortable to wear for an extended period of time. Accordingly, the user device 420 may send a message to the resource provider computer 430 requesting to return the resource (e.g., via a merchant application or an SMS). In this case, since the transaction value has already been cleared and settled, the resource provider computer 430 may need to initiate a typical transaction reversal process (e.g., as opposed to simply releasing a hold on the user's account). The transaction reversal involves an additional transfer (e.g., clearing and settlement) of the transaction value, this time moving the value from the resource provider's account at the transport entity to the user's account at the authorizing entity. Additionally, the resource provider computer 430 can transmit a collection instruction message to the delivery service computer 470.

Some embodiments of the invention allow a number of alternatives to certain details described above for the methods and system. For example, some or all of the resource provider computer's activities can be performed by an alternative entity, such as the authorizing entity computer or the transaction processing computer. For example, in some embodiments, the transaction processing computer can communicate with the delivery service computer about the delivery, communicate with the user device about whether delivered resources are accepted, and/or generate the second authorization request message (or clearance message).

As another alternative, instead of charging the user after the user has responded to an acceptance request message, the user may be charged when the delivery is completed. For example, the resource provider computer may transmit the second authorization request message (or the capture request message) automatically in response to the delivery service computer's report that the delivery is complete. In this embodiment, the user may be given an opportunity to inspect the resources immediately as they are being delivered (e.g., the delivery personnel can wait at the door while the user tries clothes on). The user can then inform the delivery personnel which resources are being kept, and the delivery personnel can provide the updated transaction details when reporting the completed delivery. The delivery personnel can also take back the resources that are being returned. Once the delivery is complete, the resource provider computer may also transmit a push notification to the user device, either indicating that the resources have been delivered and the user will now be charged, or indicating that the resources were rejected and the user's held funds will be released.

As another option, when the delivery personnel arrives with the package (e.g., at the user's home), the delivery personnel can ask the user to login to the shopping application on the user device. The user can then inspect the resources, and can accept or decline each resource via the application on the user device. The delivery personnel can observe the accept/decline process and can take back the declined resources. Also, the resource provider computer can thereby be informed which resources are being purchased and proceed to authorize, capture, and or release a hold accordingly.

As an additional option, in some embodiments, the delivery service computer can communicate with the user device about acceptance instead of the resource provider computer. For example, the resource provider computer can provide the delivery service computer with information about the transaction (e.g., resources ordered, a transaction identifier, etc.) as well as contact information for the user (e.g., a phone number, a mobile application identifier, etc.) at step S424. As a result, the delivery service computer can have enough information to send the acceptance request message to the user device (e.g., when the delivery is completed) at step S432, and the user device can then send the acceptance response message to the delivery service computer at step S438. In this case, delivery service computer can send the delivery complete message to the resource provider computer after receiving the acceptance response message from the user device (e.g., step S428 can take place after step S438), and the delivery service computer can provide information about the acceptance response message (e.g., which resources are accepted and rejected) to the resource provider computer along with the delivery complete message.

As a further option, the delivery personnel may carry a mobile device (e.g., for communicating with the delivery service computer). In some embodiments, the delivery service computer can transmit information about the delivery to the delivery person's mobile device. Then, instead of transmitting the acceptance request message to the user device, the acceptance request message can be displayed to the user via the delivery person's mobile device. The user can then select "accept" or "decline" for each delivered resource directly on the delivery person's mobile device. Then, the delivery person's mobile device (or the delivery service computer) can transmit the delivery complete message with the acceptance response information to the resource provider computer.

In further embodiments, the delivery service computer can transmit the second authorization request message (or capture request message) to the transport computer at step S458 (e.g., instead of the resource provider computer sending the message). For example, the resource provider computer can provide, to the delivery service computer, the transaction identifier and any other suitable information for generating and sending an authorization request message at step S424. Accordingly, in some embodiments, the delivery service computer can handle the acceptance communications with the user device as well as initiating the final transaction processing communications with the transport computer on behalf of the resource provider computer.

Embodiments of the invention have a number of advantages. For example, in embodiments of the invention, a pre-authorization can be used to place a hold on the user's value when the user orders a resource, but the user's value is not transferred to the resource provider until after the resource is delivered and the user has inspected the resource. Thus, the user can physically inspect a resource before committing to a purchase. This advantageously simulates an in-store shopping experience and removes the uncertainty typically experienced when shopping online, thereby improving the user's Internet commerce experience.

Additionally, waiting to fully authorize and/or clear a transaction value until after the user receives and inspects the resources can advantageously reduce electronic processing requirements and reduce bandwidth usage. Typically, if a user wants to return a resource, an entire separate transaction reversal process is performed to undo the previous transaction. Embodiments can prevent the need for the transaction reversal process by effectively stalling the initial transaction. If the user decides to return the resource, the resource provider computer can simply send a message instructing the authorizing entity computer to release a pre-authorization hold. As a result, two unnecessary fund-transfer processes are avoided. Also, the user's funds are immediately available for another transaction, instead of the funds being tied up for days or weeks during the transaction reversal process.

Embodiments of the invention also advantageously improve the user's comfort and experience because the user gains more control over the transaction process. In other pre-authorization applications, such as pre-authorizations used by gas stations, the resource provider (e.g., gas station) has direct control over when and how the transaction is finalized. In contrast, embodiments of the invention introduce electronic communications between the user device and resource provider computer after delivery and before authorization. As a result, the resource provider can seek to gain the user's permission to finalize the transaction. Thus, the user has control over when the transaction will be finalized, what the final transaction amount will be, and whether the transaction will take place at all. Control of this nature is particularly beneficial to the user during Internet purchases, as the user has to wait for the resources to be delivered. Instead of making a purchase decision based on an online description, the user can order and receive the resource in-person, and the transaction can be paused until the user receives and approves of the resource.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
receiving, by a resource provider computer comprising a processor and a memory, from a user device, a request to pre-authorize a transaction for one or more resources;
transmitting, by the resource provider computer, to an authorizing entity computer comprising a second processor and a second memory, a pre-authorization request message for the transaction, the pre-authorization request message indicating a value for the transaction, and the authorizing entity computer thereafter pre-authorizing the transaction before authorizing the transaction, wherein the pre-authorizing the transaction comprises placing a hold of the value of the transaction on an account of the user device;
receiving, by the resource provider computer, a pre-authorization response message from the authorizing entity computer indicating that the transaction is pre-authorized and processing of the transaction is initiated;
storing, by the resource provider computer, a transaction record including the pre-authorization response message and information associated with the transaction;
after receiving the pre-authorization response message, transmitting, by the resource provider computer to a delivery service computer, an instruction to deliver the one or more resources,
wherein a global positioning system (GPS) is monitored to obtain location information of the resource, wherein the location information of the resource is determined based on the GPS, and
wherein the delivery service computer sends a message to the resource provider computer indicating that the one or more resources were delivered;
determining, by the resource provider computer, whether to send a process message to the authorizing entity computer to complete processing the transaction based on location information of the resource obtained from the GPS;

generating, by the resource provider computer, an acceptance request message based on the obtained location information of the resource, wherein the acceptance request message is an application notification sent to the user device;

receiving, by the resource provider computer, an acceptance response message from the user device indicating acceptance and delivery of the one or more resources;

in response to receiving the acceptance response message from the user device, obtaining by the resource provider computer, the transaction record including the stored pre-authorization response message and the information associated with the transaction;

determining, by the resource provider computer, that the pre-authorization of the transaction is to be updated to an authorization of the transaction; and transmitting, by the resource provider computer, to the authorizing entity computer or a processing network computer, the process message to complete processing of the transaction for the value or for less than the value.

2. The method of claim 1, further comprising:

transmitting, by the resource provider computer, to the user device, the acceptance request message prompting the user device to indicate that the delivered one or more resources are accepted; and receiving, by the resource provider computer, from the user device, the acceptance response message indicating that at least one of the delivered one or more resources are accepted.

3. The method of claim 1, wherein the process message is an authorization request message or a capture request message.

4. The method of claim 1, wherein the process message is an authorization request message, and wherein the method further comprises:

receiving, by the resource provider computer, an authorization response message from the authorizing entity computer indicating that the transaction is authorized.

5. The method of claim 2, wherein the transaction is for a plurality of resources, wherein the acceptance response message indicates that at least one of the plurality or resources are not accepted, and wherein the process message is to process the transaction for less than the value in response to the at least one of the plurality or resources being not accepted.

6. The method of claim 1, wherein the received acceptance response message indicating that the one or more resources were delivered was sent in response to scanning a QR code.

7. The method of claim 1, wherein the pre-authorization request message includes a transaction identifier, and wherein the process message includes the transaction identifier.

8. A resource provider computer comprising:
a processor; and
a computer readable medium, the computer readable medium comprising code, executable by the processor, for implementing a method comprising:
receiving, by the resource provider computer from a user device, a request to pre-authorize a transaction for one or more resources;
transmitting, by the resource provider computer to an authorizing entity computer, a pre-authorization request message for the transaction, the pre-authorization request message indicating a value for the transaction, and the authorizing entity computer thereafter pre-authorizing the transaction before authorizing the transaction, wherein the pre-authorizing the transaction comprises placing a hold of the value of the transaction on an account of the user device;

receiving, by the resource provider computer, a pre-authorization response message from the authorizing entity computer indicating that the transaction is pre-authorized and processing of the transaction is initiated;

storing, by the resource provider computer, a transaction record including the pre-authorization response message and information associated with the transaction;

after receiving the pre-authorization response message, transmitting, by the resource provider computer to a delivery service computer, an instruction to deliver the one or more resources, wherein a global positioning system (GPS) is monitored to obtain location information of the resource, wherein the location information of the resource is determined based on the GPS, and wherein the delivery service computer sends a message to the resource provider computer indicating that the one or more resources were delivered;

determining, by the resource provider computer, whether to send a process message to the authorizing entity computer to complete processing the transaction based on location information of the resource obtained from the GPS;

generating, by the resource provider computer, an acceptance request message based on the obtained location information of the resource, wherein the acceptance request message is an application notification sent to the user device;

receiving, by the resource provider computer, an acceptance response message from the user device indicating acceptance and delivery of the one or more resources;

in response to receiving the acceptance response message from the user device, obtaining by the resource provider computer, the transaction record including the stored pre-authorization response message and the information associated with the transaction;

determining, by the resource provider computer, that the pre-authorization of the transaction is to be updated to an authorization of the transaction; and transmitting, by the resource provider computer to the authorizing entity computer or a processing network computer, the process message to complete processing of the transaction for the value or for less than the value.

9. The resource provider computer of claim 8, the method further comprising:

transmitting, to the user device, the acceptance request message prompting the user device to indicate that the delivered one or more resources are accepted; and receiving, from the user device, the acceptance response message indicating that at least one of the delivered one or more resources are accepted.

10. The resource provider computer of claim 8, wherein the process message is an authorization request message or a capture request message.

11. The resource provider computer of claim 8, wherein the process message is an authorization request message, and wherein the method further comprises:

receiving an authorization response message from the authorizing entity computer indicating that the transaction is authorized.

12. The resource provider computer of claim 9, wherein the transaction is for a plurality of resources, wherein the acceptance response message indicates that at least one of the plurality or resources are not accepted, and wherein the process message is to process the transaction for less than the value in response to the at least one of the plurality or resources being not accepted.

13. The resource provider computer of claim 9, wherein the acceptance request message is an SMS or an in-application push notification.

14. The resource provider computer of claim 8, further comprising:
transmitting an instruction to prepare a package including the one or more resources for delivery.

15. A method comprising:
receiving, by a user device, from a user, a selection of one or more resources to be delivered to the user for a transaction;
receiving, by the user device, from the user, an indication to pre-authorize the transaction and initiate processing of the transaction;
sending, by the user device, a request to pre-authorize the transaction for the one or more resources to a resource provider computer, the resource provider computer thereafter initiating a pre-authorization request message with a value for the transaction to an authorizing entity computer, which pre-authorizes the transaction before authorizing the transaction,
wherein the pre-authorizing the transaction comprises placing a hold of the value of the transaction on an account of the user device, and transmits a preauthorization response message back to the resource provider computer,
wherein the resource provider computer stores a transaction record including the pre-authorization response message and information associated with the transaction,
wherein the resource provider computer transmits an instruction to a delivery service computer to deliver the one or more resources,
wherein a global positioning system (GPS) is monitored to obtain location information of the resource, wherein the location information of the resource is determined based on the GPS, and
wherein the delivery service computer sends a message to the resource provider computer indicating that the one or more resources were delivered;
receiving, by the user device, an acceptance request message prompting the user device to indicate that the one or more resources were delivered and are accepted, wherein the acceptance request message is generated by the resource provider computer based on determined location information of the resource, wherein the acceptance request message is an application notification;
displaying, by the user device, to the user, a prompt to indicate whether the delivered one or more resources are accepted;
receiving, by the user device, from the user, an indication that at least one of the delivered one or more resources are accepted;
determining, by the user device, whether to send an acceptance response message based on the indication received from the user; and
sending, by the user device, the acceptance response message indicating that at least one of the delivered one or more resources are accepted, the resource provider computer thereafter obtaining the transaction record including the stored pre-authorization response message and the information associated with the transaction;
determining that the pre-authorization of the transaction is to be updated to an authorization of the transaction; and
transmitting a process message to the authorizing entity computer or a processing network computer to complete processing of the transaction for the value or for less than the value based on location information of the resource obtained from the GPS.

16. The method of claim 15, wherein the process message is an authorization request message or a capture request message.

17. The method of claim 15, wherein the transaction is for a plurality of resources, wherein the acceptance response message indicates that at least one of the plurality or resources are not accepted, and wherein the process message is to process the transaction for less than the value in response to the at least one of the plurality or resources being not accepted.

18. The method of claim 15, wherein the delivery service computer sends the message to the resource provider computer indicating that the one or more resources were delivered in response to scanning a QR code.

19. The method of claim 15, wherein the acceptance request message is an SMS or an in-application push notification.

20. The method of claim 15, wherein the acceptance request message is received from the resource provider computer, and wherein the user device sends the acceptance response message to the resource provider computer.

* * * * *